UNITED STATES PATENT OFFICE.

EDWARD MARK SLOCUM, OF MEDAN, PROVINCE OF DELI, SUMATRA, DUTCH EAST INDIES, ASSIGNOR TO GENERAL RUBBER COMPANY, A CORPORATION OF NEW JERSEY.

ADHESIVE RUBBER COMPOSITION.

1,293,957.            Specification of Letters Patent.      Patented Feb. 11, 1919.

No Drawing.      Application filed January 8, 1917. Serial No. 141,290.

*To all whom it may concern:*

Be it known that I, EDWARD MARK SLOCUM, a citizen of the United States, residing at Medan, Province of Deli, Sumatra, Dutch East Indies, have invented certain new and useful Improvements in Adhesive Rubber Compositions, of which the following is a full, clear, and exact description.

This invention relates to a rubber composition and more particularly to an adhesive rubber composition adapted for surfacing tapes and for use in general where an adhesive bond is required.

Heretofore in the preparation of adhesive compositions of the kind mentioned rubber has been mixed with asphalt, certain oxidized or sulfurized oils, etc., but the material so produced have hardened and lost their adhesive characteristics to a greater or less degree upon standing. It is accordingly my principal object to prepare an adhesive composition of the type described having a substantially permanent stickiness or adhesiveness. Another object is to devise a simple process for manufacturing the adhesive material.

The composition which I have devised in accordance with the objects mentioned may be made as follows: Castor oil is heated without access of air until the oil has lost 5 to 10% of its volume and has become thickened. The oil so thickened is then mixed with rubber or a composition containing rubber preferably by dissolving one part of thickened castor oil in two parts of gasolene or other solvent and stirring this mixture into five to six parts of uncoagulated latex. Prior to or subsequent to coagulation or at any time prior to vulcanization sulfur or other vulcanizing agent may be added to the mass. The resulting product after coagulation, etc., is a highly adhesive form of rubber and shows its tenacity by extensions into long threads when lifted from a support. The product does not lose its stickiness through stiffening of the castor oil by aging even after long standing, showing in this respect a well defined difference from rubber compounded with other boiled oils, oxidized oils, etc., which soon become hard.

In connection with the above process it is pointed out that the thickened castor oil may be emulsified instead of being dissolved and may be incorporated in the form of such emulsion. Further, the oil may be saponified and added to the latex in water solution. It will also be observed that the admixture of the oil with latex may take place before or after coagulation.

The oils in general which may be used for the production of an article having the desired characteristics are thus non-drying oils which, although they do not harden or dry to a solid film upon exposure, do assume a gummy, sticky condition when exposed. The oils of the preferred type appear to owe their desirable properties as set forth to the presence of the hydroxy group in their constitution. Various oils or admixtures thereof of the preferred type may be employed, and although a glycerid, namely, castor oil, has been set forth in the embodiment given, it will be understood that compounds containing fatty-acid radicals, fatty acids and polymerization products in general of this type of substance may be used.

Thickened castor oil is preferably employed in view of its ability to remain fluid even when exposed in thin layers to air for a considerable period. A sample of the oil treated by heating as above, retained the liquid form though spread in a thin layer and exposed to the air for a period exceeding nine months.

Having thus described my invention, what I claim and desire to protect by Letters Patent is:—

1. An adhesive material comprising a non-drying oil of the class which assumes a gummy condition when exposed and rubber-containing latex coagulated with the oil.

2. An adhesive composition comprising a non-drying oil thickened by heating, and a rubber-containing latex coagulated with the oil in solution.

3. An adhesive material comprising castor oil, and a rubber-containing latex coagulated with the oil.

4. A process for producing an adhesive material which comprises mixing a non-drying oil of a class which assumes a gummy condition upon exposure in a volatile solvent with rubber-containing latex, and coagulating the mass.

5. A process for producing an adhesive material which comprises mixing thickened castor oil dissolved in a volatile solvent with rubber-containing latex, and coagulating the mass.

Signed at New York, county and State of New York, this 5 day of January 1917.

EDWARD MARK SLOCUM.